United States Patent [19]

Dojan

[11] Patent Number: 5,125,501
[45] Date of Patent: Jun. 30, 1992

[54] INFEED CONVEYOR WITH MULTIPLE FLIGHT CAPABILITY

[75] Inventor: Harold D. Dojan, Luck, Wis.

[73] Assignee: Doboy Packaging Machinery, Inc., New Richmond, Wis.

[21] Appl. No.: 679,257

[22] Filed: Apr. 2, 1991

[51] Int. Cl.⁵ .............................................. B65G 19/26
[52] U.S. Cl. ..................................... 198/732; 198/718
[58] Field of Search ............... 198/717, 718, 725, 732, 198/476.1

[56] References Cited

U.S. PATENT DOCUMENTS

| | | | |
|---|---|---|---|
| 3,198,316 | 8/1965 | Bivans | 198/473.1 |
| 3,812,955 | 5/1974 | Kopp | 198/732 |
| 3,960,263 | 6/1976 | Isaksson et al. | 198/718 |
| 4,266,482 | 5/1981 | Barber | 198/718 X |
| 4,353,276 | 10/1982 | Ackerfeldt | 83/708 |
| 4,411,355 | 10/1983 | Furlette et al. | 198/718 |
| 4,417,653 | 11/1983 | Zwezerynen | 198/718 |
| 4,506,488 | 3/1985 | Matt et al. | 53/55 |
| 4,546,597 | 10/1985 | Denker | 53/540 |
| 4,815,586 | 3/1989 | Heising | 198/727 |

FOREIGN PATENT DOCUMENTS

| | | | |
|---|---|---|---|
| 2355143 | 5/1974 | Fed. Rep. of Germany | 198/718 |
| 2727038 | 1/1978 | Fed. Rep. of Germany | |
| 0090309 | 6/1982 | Japan | 198/717 |
| 0673550 | 7/1979 | U.S.S.R. | 198/718 |
| 0930560 | 7/1963 | United Kingdom | |
| 1443079 | 7/1976 | United Kingdom | 198/732 |

*Primary Examiner*—Robert P. Olszewski
*Assistant Examiner*—James R. Bidwell
*Attorney, Agent, or Firm*—Haugen and Nikolai

[57] ABSTRACT

A product feed device includes multiple drivers mounted pivotally between a pair of parallel and opposed endless chains. When pivoted to an active position, each driver engages a product and pushes the product along a path. A set of cams is disposed upstream of the path. Each of the cams is alternatively positionable in alignment between the chains, to engage successive drivers to either set or reset the drivers as they encounter the cam. The cams set and reset successive drivers in different repeating sequences, thus to enable switching from one selected spacing between actuated cams to another, depending on which cam is in the operating position. A pair of opposed guide members extend longitudinally along the path to confine the chains against transverse movement, and maintain each of the drivers in its selected orientation, whether set to active or reset to a bypass position.

36 Claims, 5 Drawing Sheets

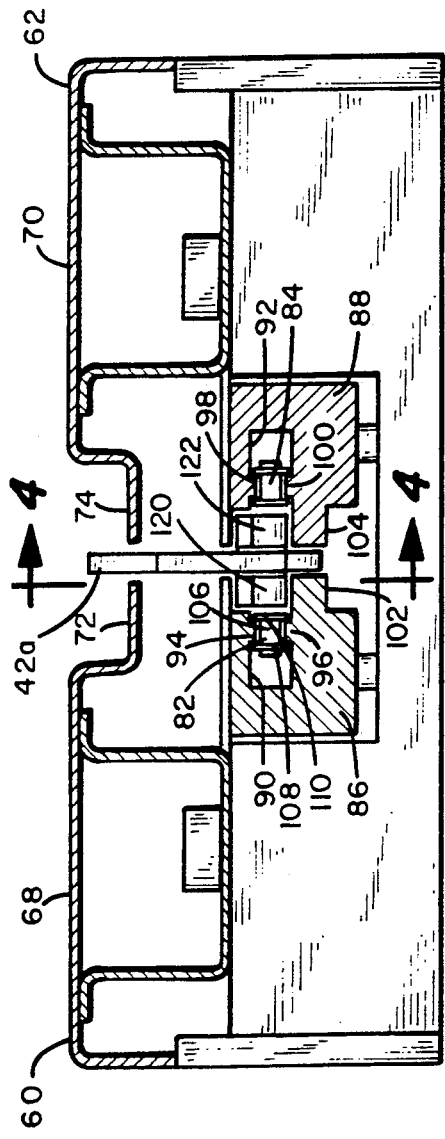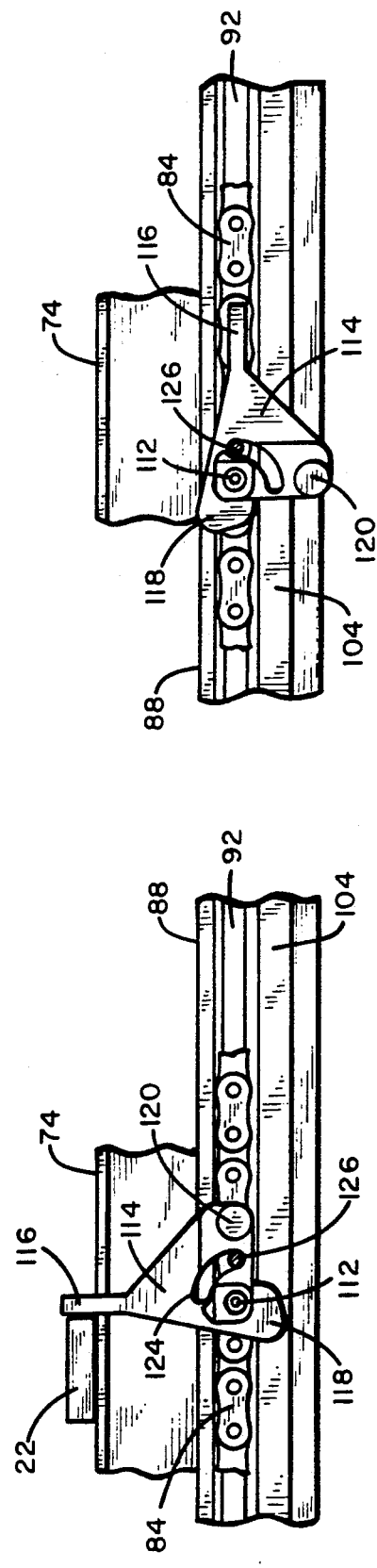

INFEED CONVEYOR WITH MULTIPLE FLIGHT CAPABILITY

BACKGROUND OF THE INVENTION

This invention relates to devices for handling and transporting substantially identical objects in series, and more particularly to conveyors for delivering food items or other products at controlled intervals for automatic packaging.

Endless conveyors, particularly in the form of chains, are frequently employed to move a wide variety of solid materials. For example, a chain scraper conveyor for transporting granular and abrasive material is disclosed in U.S. Pat. No. 4,815,586 (Heising). More particularly, a pair of parallel chains carries spaced apart drivers through a trough to carry particulates through the trough. Rollers in the trough support the drivers and reduce friction.

U.S. Pat. No. 4,353,276 (Ackerfeldt) discloses an infeeding conveyor for work pieces to be cut by a stationary sawing machine. The conveyor includes two independently driveable endless chains, with at least one dogging means mounted to each chain. As one of the chains and dogging means feeds a log toward the saw, another one of the chains can be moved to align its dogging means for receiving the next log to be cut.

In many applications it is desirable to provide controlled, consistent spacing between adjacent drivers or pushers, to accommodate a series of substantially equally sized objects. In this regard, the most direct approach is to permanently secure the drivers, equally spaced apart from one another a distance slightly greater than the length of the objects to be conveyed. A device capable of limited adjustment of this spacing is disclosed in U.S. Pat. No. 3,198,316 (Bivans). A pair of endless chains, one carrying spaced apart leading fingers and the other carrying spaced apart lagging fingers, interact with sprocket for tilting the lagging finger backward to increase the size of the space for receiving the box, affording greater tolerance for a device that feeds the boxes to the conveyor.

With automatic packaging or wrapping of products, the need arises to feed items at controlled intervals for wrapping, and preferably at high speed. Horizontal wrapping machines, for example as disclosed in U.S. Pat. No. 4,506,488 (Matt et al), typically involve drawing and shaping a continuous film of pliable packaging material into a continuous tube that receives a series of spaced apart food items or other products to be packaged. The tube is drawn past sealing and cutting stations to individually package the products.

The introduction of computer controlled and servo motor operated drawing, sealing, cutting, etc. in wrapping devices affords the ability to pre-program product changeovers, which is a considerable advantage. However, a changeover to a product of different size traditionally has required a corresponding adjustment to the infeed conveyor to the wrapping device. Usually, this involves replacing one chain or endless conveyor with another conveyor having the appropriate spacing between pushers. Thus the changeover is time consuming and costly since the packing device can not operate during the changeover.

Therefore, it is an object of the present invention to provide an endless conveyor carrying multiple drivers along its length, in which selective subsets of the drivers can be actuated for controllably varying the distance between adjacent actuated drivers.

Another object is to provide a chain conveyor in which drivers carried by an endless chain are actuated by a means traveling approximately the same speed as the chain.

A further object of the invention is to provide, in connection with an endless chain carrying multiple actuatable drivers, a means for positively actuating or positively retracting each driver as it approaches a path for conveying objects.

Yet another object is to provide an endless chain drive with multiple drivers configured to avoid off-center loading of the drivers, and with guide means for substantially preventing movement of the endless chain normal to the direction of chain travel.

SUMMARY OF THE INVENTION

To achieve these and other objects, there is provided an apparatus for conveying objects in a series along a selected path and with controlled spacing between successive objects in the series. The apparatus includes a stationary support structure having a support surface for supporting objects by gravity for movement along a selected path. An endless conveyor means is mounted on the support structure such that a portion of the length of the conveyor means runs along and adjacent the selected path. A moving means is provided for moving the endless conveyor means relative to the support structure. A plurality of drivers are mounted to the endless conveyor means and spaced apart from one another along the length of the conveyor means. Each of the drivers is mounted to reciprocate relative to the conveyor means between an active position for engaging one of the objects to move the object along the selected path with the conveyor means, and a bypass position wherein the driver does not engage the object.

A first driver control means is mounted movably to the support structure near one end of the path. The control means includes a setting means for engaging at least first selected ones of the drivers as they are carried toward the path by the conveyor means, thus to urge the first selected drivers into the extended position for moving the object along the path. A governing means moves the control means relative to the support structure such that the setting means, when it engages the first selected drivers, is moving at approximately the same speed as the endless conveyor means.

The preferred control means is a cam mounted rotatably to the support structure. The cam has a plurality of radially extended lobes, with setting means comprised of setting surfaces at the radially outward ends of the lobes. The cam is rotated so that the tangential speed of the lobe outward ends substantially matches the linear speed of the endless conveyor. Accordingly, even at high conveyor speeds, control of the drivers is smooth, with minimal shock or vibration, due to the matching of the cam and conveyor speeds.

Another aspect of the invention involves providing a second driver control means, also mounted movably to the support structure near the same end of the path. The second control means has its own setting means for engaging second selected ones of the drivers to urge them into the active position. A selection means mounts both the first and second control means to the support structure. The selection means is operable to selectively position either the first or second control means in position to engage its associated selected drivers, while the other control means remains free of the drivers.

Consequently, either of two alternate schemes for selecting drivers can be employed with the endless conveyor, simply through adjusting the selection means. This enables the spacing between actuated or extended drivers to be adjusted "on the fly", without disassembling and replacing the conveyor.

According to yet another aspect of the invention, each of the control means can include a resetting means in addition to the setting means. The resetting means engages all drivers other than the selected drivers (engaged by the setting means) as they are carried toward the path, to urge such other drivers into the bypass position. Accordingly, all drivers are positively adjusted, either to the active position or to the bypass position, for a substantially improved and smoother operation, particularly at high speeds. Thus, it becomes practicable to operate at speeds where depending on gravity to retract drivers has been found unsatisfactory.

According to another aspect of the present invention, the endless conveyor means includes a pair of endless chains mounted to the support member in parallel, spaced apart relation to one another. The moving means is operably coupled to the chains and to the support structure, and moves the chains in concert with respect to the support structure. Each of the drivers is centrally disposed between the two chains, and secured to both of the chains. This arrangement avoids off-center loading on the drivers as they move objects along the path, and accordingly reduces the load on the chain. This also permits the chains to be substantially shielded from objects being moved along the path by the drivers, to protect the chains from debris generated by the objects. More particularly, the support structure can include a pair of opposed channels along the path, each of the channels substantially enclosing one of the chains to substantially prevent the chain from displacement perpendicular to its direction of travel along the path. Guide flanges, also running along the path, capture the drivers to positively maintain each driver, either in the active position or the bypass position, as it traverses the path.

Thus, the present invention encompasses a variety of improvements to an endless conveyor carrying multiple drivers for moving objects along a path, to enable substantially higher speed operation than is practical under conventional approaches, and further to enable precise control and adjustment of the spacing between adjacent drivers along the conveyor.

IN THE DRAWINGS

For a further appreciation of the above and other features and advantages, reference is made to the following detailed description and to the drawings, in which:

FIG. 3 is a sectional view taken along the line 3—3 of FIG. 1;

FIGS. 4a and 4b are sectional views taken along the line 4—4 in FIG. 3, illustrating a driver in the active and bypass positions, respectively;

Figure 12:
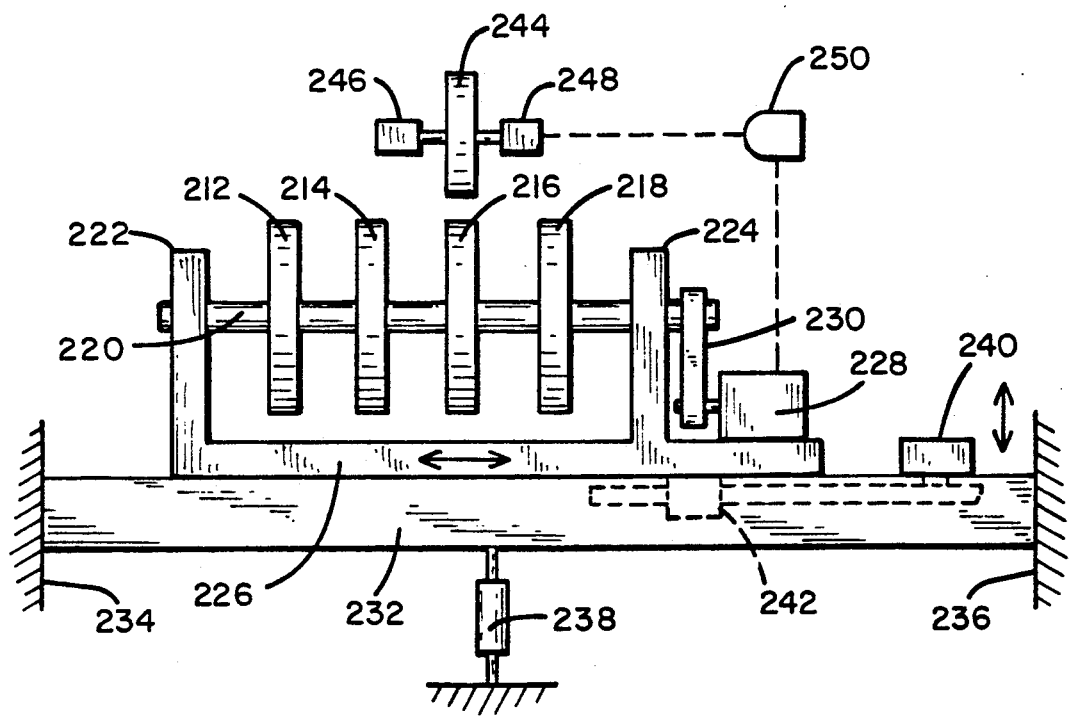
Figure 9:
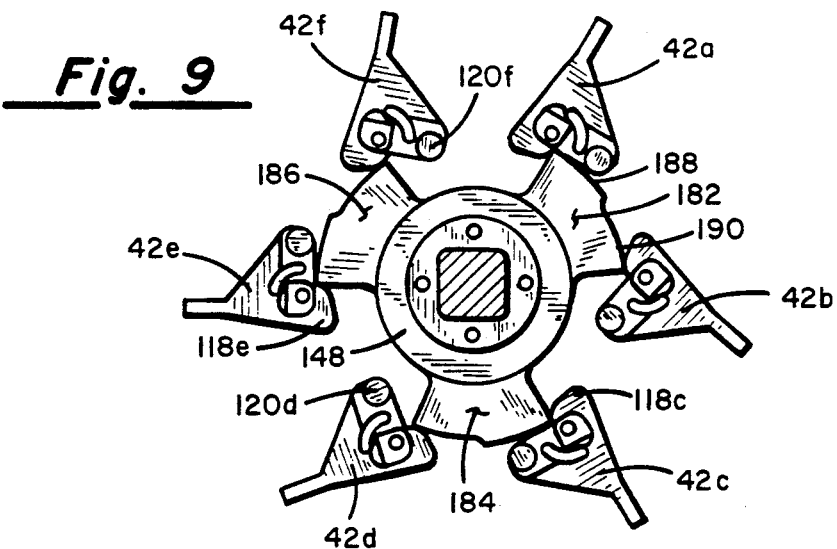
Figure 10:
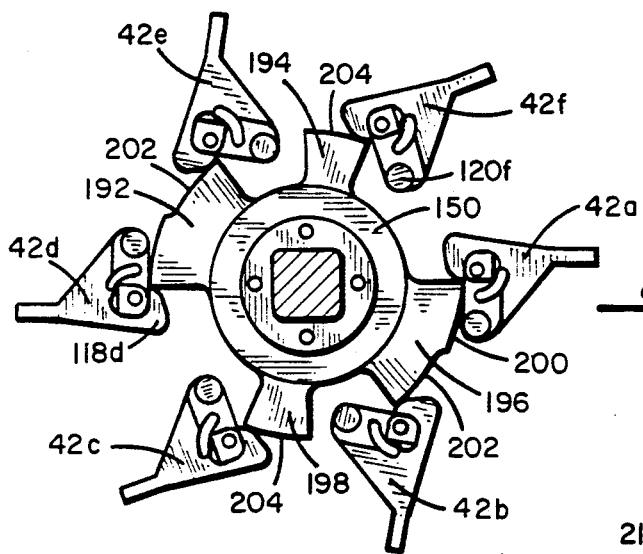
Figure 11:
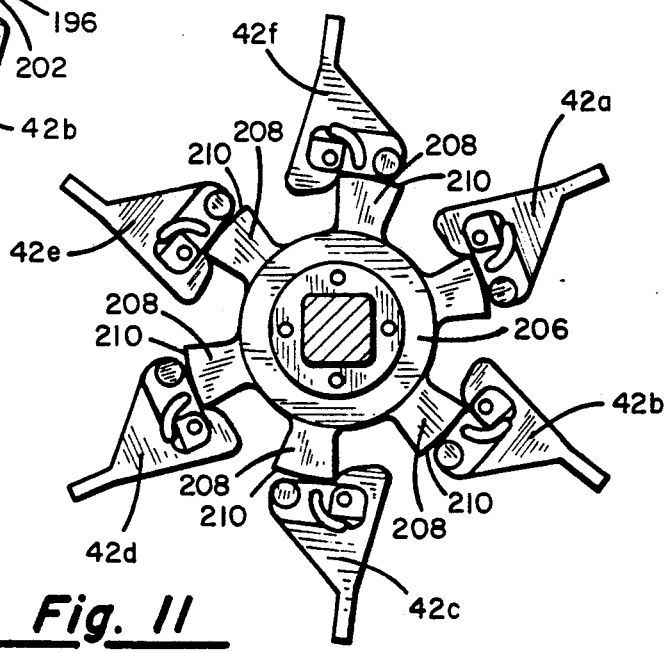

FIGS. 9, 10 and 11 schematically illustrate the operation of three alternative cams for selectively setting and resetting drivers carried by the conveyor; and FIG. 12 is a diagrammatic view of an alternative driver control cam assembly, showing multiple flight capability.

DETAILED DESCRIPTION OF THE PREFERRED EMBODIMENT

Figure 1:
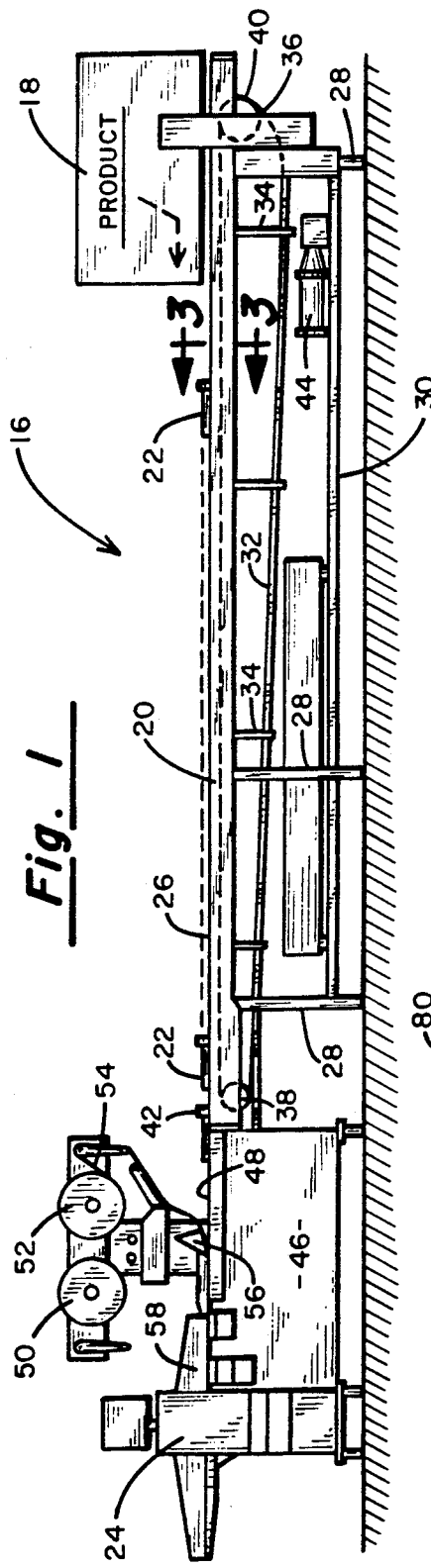
FIG. 1 is a side elevation of a system for automatic wrapping of products including a product feed device constructed in accordance with the present invention.

Turning now to the drawings, there is shown in FIG. 1 a product handling and packaging system 16 including a bin 18, an in-feed device 20 for conveying a product as a series of equally spaced apart individual items 22, and an automatic packaging device 24, also known as horizontal wrapper, for receiving and packaging the items. Items 22 can be candy bars supported on creased cardboard trays. Alternatively, the items can be any solid objects (other than particulate or granular) capable of being pushed or driven by the infeed device and wrapped by packaging device 24.

Feed device 20 includes a stationary and rigid support structure including a table 26, a plurality of legs 28 secured to the table, and horizontal support bars attached to the legs including a bottom bar 30 and an inclined bar 32. Uprights 34 are secured to the table and to the inclined bar. Table 26 is substantially horizontal, but also has a trough or channel along its length, providing a longitudinal path along which product items 22 travel toward packaging device 24.

An endless conveyor 36 is mounted for movement relative to the support structure by the series of rotatable sprocket assemblies, two of which are shown at 38 and 40. Conveyor 36 is somewhat triangular, with an upper horizontal portion running along the path (i.e. along the length of table 26) and a lower inclined portion just above inclined bar 32. Endless conveyor 36 carries a plurality of drivers or pushers 42, spaced equally apart from one another along the length of the conveyor. Each driver 42 shown in FIG. 1 is engaged with the rearward end of a product item 22, thus to push its associated product item along the path as a motor 44 drives the conveyor via one of the sprocket assemblies. The spacing between successive drivers 42 is just slightly larger than the length of product items 22, to afford optimum control of the spacing between successive items as the product is fed in series to packing device 24. The drivers preferably are formed of a material selected for toughness, e.g. Hytrel or Delron brand polyesters, or metal such as stainless steel.

Packaging device 24 includes a frame 46 supporting a horizontal table level with table 48 level with the table 26 of the feed device. Two supply rolls at 50 and 52 alternatively provide a continuous film 54 of packaging sheet material to a forming station 56 where the sheet material is formed into a continuous tube. Product items 22 are fed in series into the tube, and move with film 54 through a sealing and cutting station 58, where the continuous tube is formed into individual packages or wrappers, one enclosing each of the product items. The details of the packing device are not further discussed herein. For more information about this type of device, reference is made to the aforementioned U.S. Pat. No. 4,506,488 (Matt et al).

Figure 2:
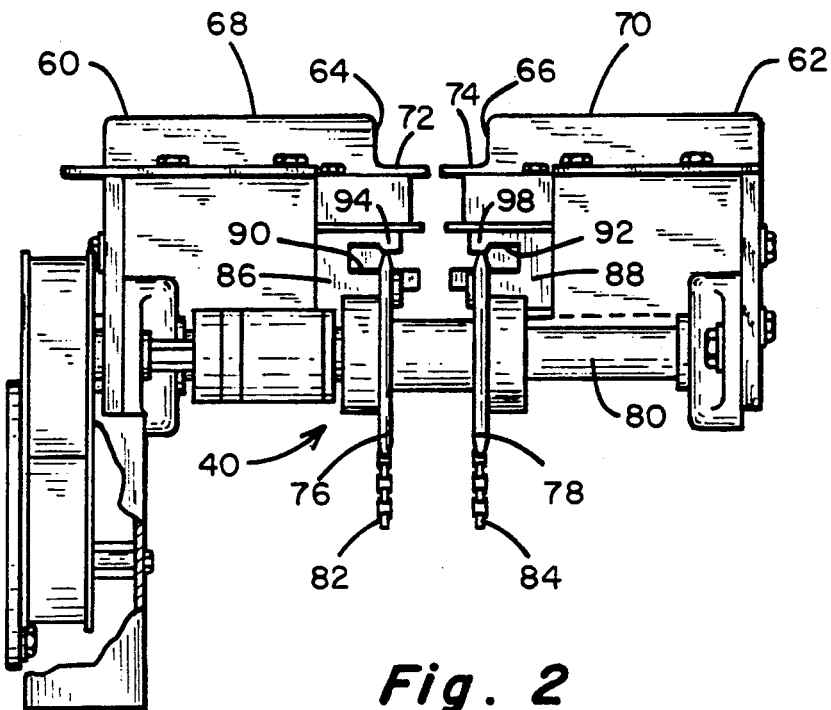
FIG. 2 is an end view of the feed device.

As seen in FIG. 2, table 26 includes two table sections 60 and 62 symmetrical about a vertical plane. Respective vertical walls 64 and 66 depend downwardly from respective top surfaces 68 and 70 of the opposed sections. Respective horizontal ledges 72 and 74 project transversely toward one another, and together provide a support surface for product items 22 as they traverse the longitudinal path. A central gap between the ledges runs the length of the path. Table sections 60 and 62 preferably are formed of stainless steel Delron brand polyester or other material suitable for contact with food.

As seen in FIG. 2, sprocket assembly 40 includes two parallel and spaced apart sprockets 76 and 78 mounted to rotate in concert on a shaft 80. Conveyor 36 includes a pair of endless chains 82 and 84, generally known as roller chains, parallel and spaced apart from one another on opposite sides of the central vertical plane.

Two opposed guide members 86 and 88 run the length of the path. The guide members are substantially uniform in transverse profile, and preferably are formed of polyester or other suitable polymer to provide durability and smooth, tough, low friction surface. Each of guide members 86 and 88 is formed to provide an elongate channel, as indicated at 90 and 92, respectively. The channels are large enough to accommodate lobes (not shown) mounted on chains 82 and 84 for proximity sensing. Opposed rails 94 and 96 extend vertically into channel 90, while corresponding rails 98 and 100 project vertically into channel 92. Respective flanges or shelves 102 and 104 of the guide members project toward one another.

The manner in which the endless chains and drivers are confined within the guide members is shown in FIG. 3. The links of endless chains 82 and 84 are substantially identical, each including a central barrel portion between two edge portions slightly wider than the barrel diameter. With reference to endless chain 82, rails 94 and 96 project toward a barrel 106 between edge portions 108 and 110, and thus confine the chain against any transverse movement, both in the vertical and horizontal directions as viewed in FIG. 3. Rails 98 and 100 similarly confine chain 84 within channel 92 of guide member 88.

Guide members 86 and 88 further serve to control the orientation of drivers 42 as they proceed along the path toward packaging device 24. More particularly, flanges or shelves 102 and 104 cooperate with guide extensions of the drivers to orient the drivers as desired. Each driver is secured to both chains 82 and 84 and aligned centrally between the chains, as is shown for driver 42a in FIG. 3. As seen in FIGS. 4a and 4b, driver 42a is mounted pivotally to chains 82 and 84 through a pin 112. The driver has a somewhat triangular body 114, a stem 116 extended from the body, a lug 118 extended from the body opposite the stem, and a pair of opposed extensions 120 and 122 projected transversely outwardly of the body. Pin 112 is mounted to one of the links of chain 82, and to one of the links of chain 84.

An arcuate slot 124 is formed in driver 42a. A pin 126, extending through the slot and mounted to one of the links of each chain, limits the degree of driver pivoting with respect to chains 82 and 84.

In FIGS. 3 and 4a, drive 42a is shown in an active position in which it can move one of product items 22 along the path as motor 44 drives chains 82 and 84.

Guide extensions 120 and 122 are disposed above flanges 102 and 104, which prevents driver 42a from pivoting out of the active or driving position.

FIG. 4b shows driver 42a in the retracted or bypass position, in which it can not engage product items supported on ledges 72 and 74. Guide extensions 120 and 122 are captured below their respective flanges 102 and 104, maintaining the driver in the bypass position.

Figure 5:
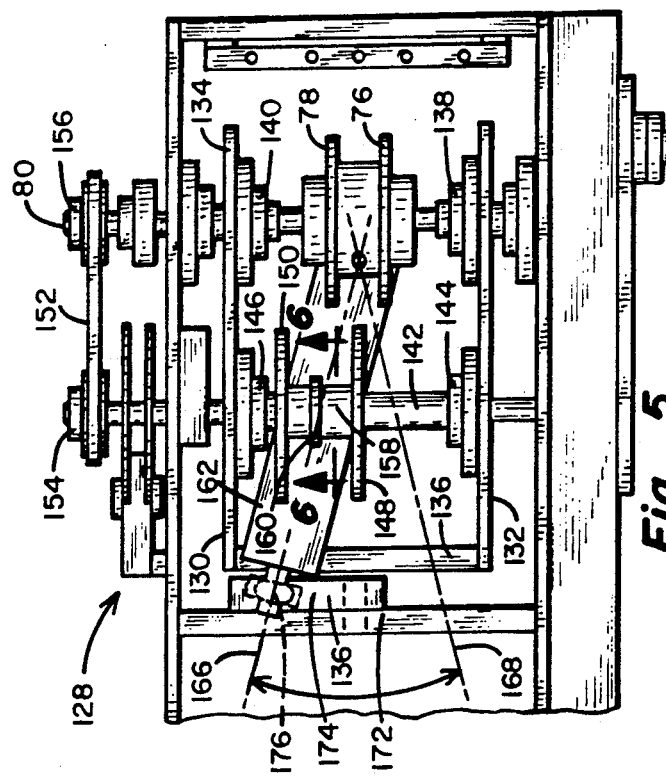
FIG. 5 is an enlarged top view of a portion of the feed device, illustrating a driver control assembly of the device.

In FIG. 5, the rearward end of feed device 20 is shown with table 26 removed, to illustrate a driver control assembly 128. Control assembly 128 is located immediately upstream of the path, and determines the orientation of drivers 42 as they enter the path. The control assembly includes a box-like frame 130 mounted to pivot about sprocket supporting shaft 80 relative to the stationary support structure. Frame 130 includes a pair of opposed side plates 132 and 134 and a forward plate 136, and has an open bottom. Shaft 80 rotates relative to the side plates through bearing assemblies 138 and 140. Sprockets 76 and 78 rotate with the shaft.

A cam shaft 142 is journaled to the side plates through bearing assemblies at 144 and 146. Mounted to shaft 142 for rotation therewith are a pair of spaced apart driver controlling cams 148 and 150. A timing belt or chain 152, trained on pulleys 154 and 156 on shafts 142 and 80 respectively, driveably engages the shafts so that they rotate at the same speed. It is to be understood that any desired linear relationship of the shaft speeds can be obtained through proper selection of the pulleys. In the present case, the diameter of cams 148 and 150 is substantially equal to the diameter of sprockets 76 and 78, so that these components have substantially the same tangential speed.

Figure 6:
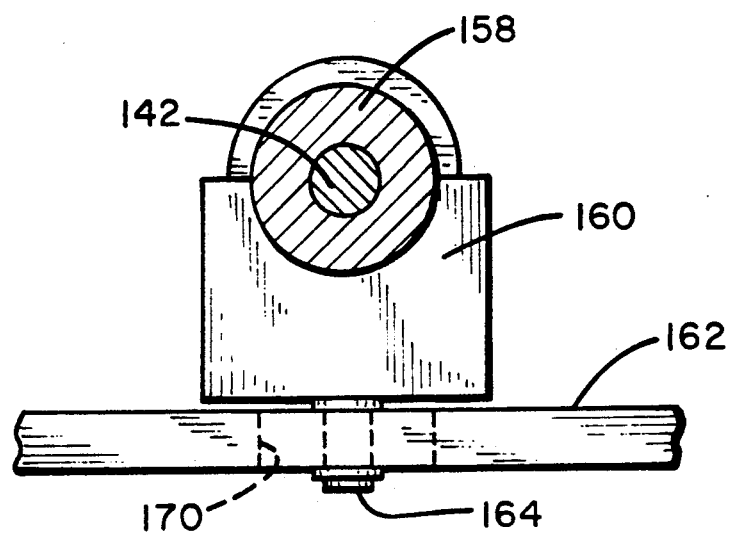
FIG. 6 is a sectional view taken along the line 6—6 in FIG. 5.
Figure 7:
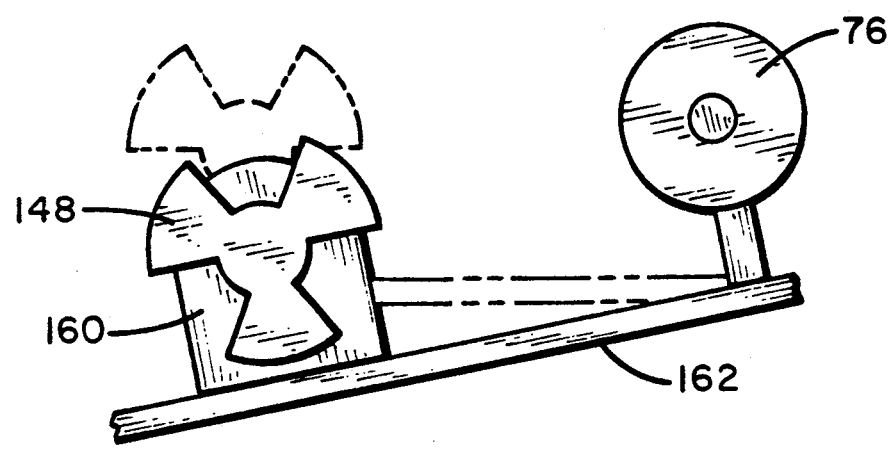
FIG. 7 is a diagrammatic side view illustrating pivoting of the driver control assembly.

Between cams 148 and 150, shaft 142 is surrounded by a sleeve 158. A mounting plate 160 (FIG. 6) surrounds the sleeve, and is secured against transverse movement by an annular groove in the sleeve, in which plate 160 is situated.

An elongate arm 162 is mounted to pivot relative to frame 130 about a substantially vertical pivot axis. Mounting plate 160 is mounted to pivot relative to arm 162 about a substantially vertical axis by a pin 164 integral with the mounting plate. Consequently, cams 148 and 150 and sleeve 158 slide along shaft 142 arm 162 pivots between its upper position as viewed in FIG. 5 along a broken line 166, and a lower position along a broken line 168. A slot 170 in the arm accommodates limited linear movement of mounting plate 160 relative to the arm.

The forward portion of control assembly 128 is supported on a cross beam 172 through a crank 174 rotatable on the beam about a longitudinal axis. Crank 174 supports the forward end of arm 162 through a bearing 176. Arm 162 supports frame 130 by virtue of its containment in an elongate, transverse slot 178 through forward plate 136 (FIG. 8).

Figure 8:
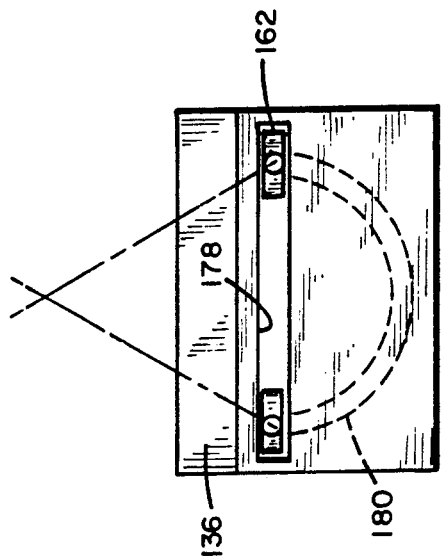
FIG. 8 is diagrammatic forward view of the control assembly.

Crank 174 when rotated carries arm 162, and thus cams 148 and 150, along an upwardly concave arcuate path indicated by a broken line 180 in FIG. 8. For the arm position shown in solid lines in FIG. 5, cam 148 is in the operative position, i.e. centered between sprockets 76 and 78 and positioned to engage drivers 42 as chains 82 and 84 carry the drivers from the right to the left as viewed in FIG. 5. Conversely, when arm 162 is located as shown in solid lines in FIG. 8, cam 150 is in the operative position.

When arm 162 is intermediate the operating positions, the arm is pivoted counter clockwise as viewed in FIG.

7, bringing cams 148 and 150 downward so that the cams are clear of the drivers. Frame 130 pivots downwardly with arm 162, due to the containment of the arm within slot 178. Through this arrangement, both cams are disengaged from the drivers whenever they are being repositioned by crank 174. This facilitates changing cams on the fly, even when operating chains 82 and 84 at high speed, virtually eliminating down time when switching from one size of product item to another.

FIGS. 9 and 10 schematically illustrate six drivers 42a-42f distributed radially about cam 148 and cam 150, respectively. It is to be understood that the drivers are in fact not distributed about the cams in this fashion. Yet, the illustrations facilitate explaining how the cams set the orientation of each drive member as it approaches the path. Cam 148 has three substantially identical lobes 182, 184 and 186. Lobe 182 has a setting end or surface 188 which, when it encounters body 114 of a drive member, sets the drive member in the active position (FIG. 4a). Lobe 182 further includes a reset end or surface 190 which, upon encountering lug 118 of one of the drivers, resets the driver into the retracted or bypass position. Lobes 184 and 186 have substantially identical setting and resetting edge portions. Thus, setting and resetting edge portions are distributed alternately about the cam circumference, spaced apart from one another by about 60 degrees.

In actual operation, cam 148 rotates counter clockwise as viewed in FIG. 9 while chains 82 and 84 bring successive drivers 42 into contact with the cam as they move from right to left. Successive drivers in the series are spaced equally apart from one another. Consequently, every other driver is set, as indicated by drivers 42a, 42c and 42e, while the alternate drivers 42b, 42d and 42f are reset. Given a three inch spacing between consecutive drivers, this arrangement would accommodate product items five inches long, for example.

FIG. 10 shows cam 150 to have four radially extended lobes at 192, 194, 196 and 198. Lobes 192 and 196 are similar to the lobes of cam 148, with setting edges at 200 and resetting edges at 202. Alternate lobes 194 and 198 have only resetting edges 204. This arrangement, again assuming a three inch spacing between successive drivers, would accommodate product items having a length of eight inches, with the spacing between set or actuated drivers being nine inches.

In operation, feed device 20 accommodates a preprogrammed switch by packaging device 24 as follows. Assume that cams 148 and 150 are positioned as shown in FIG. 5, and candy bars five inches long are being supplied to packaging device 24 for wrapping. When a product changeover is desired, for example to an eight inch candy bar, crank 174 is pivoted to place cam 150 into the operative position. With every third driver rather than every other driver actuated, spacing between successive actuated drivers is increased from six inches to nine inches, without any need to reduce the speed of the chains, much less adjust or replace them.

It is to be understood that cams 148 and 150 are disposed immediately upstream of guide members 86 and 88, so that flanges 102 and 104 capture each pair of guide extensions 120 and 122 almost immediately after the cam orients each driver. The guide members thus positively maintain each driver in its selected position, either active or bypass, along the entire length of the path.

Certain features of the present invention are particularly advantageous when applied to high speed operations. For example, the various resetting edges positively position each rejected driver in the bypass position. The conventional approach has been to rely on gravity to maintain such drivers in the bypass position. The positive reset feature, and flanges that secure the drivers against drifting from either position, substantially enhance reliability and enable significantly increased chain speeds.

Another feature particularly useful at high speeds relates to the fact that cams 148 and 150, when either setting or resetting the drivers, are moving at approximately the same speed as the drivers. In the present embodiment, this is due to the fact that shafts 80 and 142 rotate at the same speed, and that the cams and sprockets have the same diameter. This virtually eliminates the shock and vibration caused by inserting stationary tripping members into the path of the oncoming drivers.

The chains and opposed guide members further enhance the utility of feed device at high speeds. The side-by-side arrangement of chains 82 and 84 allows drivers 42 to be centered. This virtually eliminates off-center loading as the drivers push items along the path, which reduces the load on the chains and increases their useful life. Guide members 86 and 88 along the entire length of the path, positively retain chains 82 and 84 against undue vibration or transverse movement, further reducing wear to the chain. Also, as perhaps best seen in FIG. 3, the guide members substantially enclose the chains within respective channels 90 and 92, protecting the chains from food particles or other foreign matter.

FIG. 11 illustrates a cam 206 that can be mounted upon shaft 142 in lieu of either one of cams 148 and 150. Cam 206 has six substantially identical lobes 208, spaced equally (30 degrees) apart from one another. Each of the lobes has a setting edge 210, and there are no resetting edges. Accordingly, cam 206 places every one of drivers 42a-f in the extended position, for pushing items less than three inches in length, again assuming a three inch spacing between successive drivers.

FIG. 12 illustrates a driver control assembly for use in an alternative embodiment feeding device. A group of four cams 212, 214, 216 and 218 are mounted on a shaft 220, the shaft in turn being journaled in upright plates 222 and 224 of a frame 226. A servo motor 228 rotates shaft 220 through a belt 230.

Frame 226 is supported on a horizontal platform 232, with the platform in turn being slideable relative to stationary framework at 234 and 236. A pneumatic cylinder 238 is extensible and retractable to reciprocate platform 232 vertically as viewed in the figure. A motor 240 operates a worm gear 242 or the like to move frame 226 to the left and right as viewed in FIG. 12. Thus, motor 240 is operable to position any one of cams 202-208 in alignment with a driver 244 secured to opposed chains 246 and 248. Cylinder 238 is retractable to prevent the cams from engaging any of the drivers during switching of the cams.

In this embodiment, there is no direct mechanical linkage between cam shaft 220 and any of the sprockets that drive chains 246 and 248. Rather, a detector 250 senses movement of the chains, and provides a signal that indicates the chain velocity to servo motor 228 . Servo motor 228 responds to the signal in setting the shaft rotational velocity. As one example, suppose drivers 244 are spaced apart three inches from one another. Cams 212, 214, 216 and 218 can be configured respectively to set every driver for three inch spacing, to set every other driver for six inch spacing, to set every third driver for nine inch spacing and to set every sixth driver for eighteen inch spacing between successive set drivers. In addition to rapid changes in spacing between active drivers, this arrangement affords an additional advantage in that chains 246 and 248, even for nine inch or eighteen inch spacing, can be adjusted as to their length in increments of three inches rather than nine or eighteen inches.

Thus in accordance with the present invention, a feed device can be adjusted to handle products of different sizes on the fly, a particularly useful feature in connection with a packaging machine that can be adjusted on the fly to wrap different sized packages. Smooth setting and resetting of product drivers is provided, even at high speeds, by virtue of cams with setting and resetting edges moving at approximately the same speed as drivers carried by the chains. Positive setting and resetting of the drivers, in combination with guide members that maintain the drivers in their selected orientations, eliminate any drift of the drivers to further increase reliability at high speeds. The guide members further envelop the chains, substantially eliminating unwanted transverse movement, and protect the chain against contamination from debris. The dual chain arrangement also affords a balanced loading of the chain through the drivers.

What is claimed is:

1. An apparatus for conveying objects in a series along a selected path and with controlled spacing between successive objects in the series, including:
   a stationary support structure having a support surface for supporting objects by gravity for movement along a selected path;
   an endless conveyor means mounted on the support structure such that a portion of the length of the conveyor means runs along and adjacent the selected path;
   a moving means for moving the endless conveyor relative to the support structure;
   a plurality of drivers mounted to the endless conveyor means and spaced apart from one another along the length of the conveyor means, each of the drivers being mounted to reciprocate relative to the conveyor means between an active position for engaging one of the objects to move the object along the path with the endless conveyor, and a bypass position wherein the driver does not engage the object;
   a first driver control means mounted movably to the support structure near one end of the path and including a first setting means for engaging at least first selected ones of the drivers as the drivers are carried toward the path by the conveyor means, to urge the first selected drivers into the active position for moving the objects along the path; and
   a governing means for moving the control means relative to the support structure such that the setting means, when engaging the selected drivers, travels at approximately the same speed as the endless conveyor means.

2. The apparatus of claim 1 wherein:
   said first control means further includes a resetting means for engaging the drivers other than the first selected drivers as they are carried toward the path, to urge said other drivers into the bypass position, said resetting means when engaging the other drivers traveling at approximately the same speed as the endless conveyor means.

3. The apparatus of claim 2 wherein:
   the first control means includes a first cam mounted rotatably to the support structure and having a plurality of radially extended lobes, and wherein the setting and resetting means comprise respective setting and resetting surfaces located at the radially outward ends of the lobes.

4. The apparatus of claim 3 wherein:
   said governing means includes a linkage for driveably engaging the first cam and the endless conveyor means.

5. The apparatus of claim 4 wherein:
   the drivers are spaced equally apart from one another along the length of the conveyor means.

6. The apparatus of claim 5 wherein:
   said lobes are arranged to provide a repeating pattern of N resetting surfaces between each adjacent pair of setting surfaces, where N is an integer.

7. The apparatus of claim 1 further including:
   a second driver control means mounted movably to the support structure near said one end of the path adjacent the first control means, said second control means including a second setting means for engaging at least selected second ones of the drivers as they are carried toward the path, to urge the second selected drivers into the active position for moving the objects along the path.

8. The apparatus of claim 7 wherein:
   said governing means moves the second control means relative to the support structure such that the second setting means when engaging the second selected drivers is moving at approximately the same speed as the endless conveyor means.

9. The apparatus of claim 1 wherein:
   the support structure includes a guide means extended in a longitudinal direction along the path for maintaining each of the first selected drivers in the active position as it travels along the path, and for maintaining each of the other drivers in the bypass position as it travels along the path.

10. The apparatus of claim 9 wherein:
    the guide means includes a guide flange, and each of the drive members includes a transverse extension, said extension maintaining its respective driver in the active position when captured below the flange and maintaining the respective driver in the retracted position when captured above the flange.

11. The apparatus of claim 9 wherein:
    said conveyor means includes a pair of endless chains mounted to the support member in parallel and spaced apart relation to one another for movement in concert with one another, and wherein the drivers are mounted to both of the chains and positioned between the chains.

12. The apparatus of claim 7 further including:
    a third driver control means mounted movably to the support structure near said one end of the path adjacent the first control means, said third driver control means including a third setting means for engaging at least selected third ones of the drivers as they are carried toward the path, to urge the third selected drivers into the active position for moving the objects along the path.

13. An apparatus for conveying objects in a series along a selected path, and for altering the spacing between successive objects in the series, including:

a stationary support structure having a support surface for supporting objects by gravity for movement along a selected path;

an endless conveyor means mounted on the support structure such that a portion of the length of the conveyor means runs along and adjacent the selected path;

a moving means for moving the endless conveyor relative to the support structure;

a plurality of drivers mounted to the endless conveyor means and spaced apart from one another along the length of the conveyor means, each of the drivers being mounted to reciprocate relative to the endless conveyor means between an active position for engaging one of the objects to move the object along the identical path with the conveyor means, and a bypass position wherein the driver does not engage the object;

a first driver control means mounted movably to the support structure near one end of the path and including a first setting means for engaging at least first selected ones of the drivers as they are carried toward the path by the conveyor means, to urge the first selected drivers into the active position for moving the objects along the path;

a second driver control means mounted movably to the support structure near said one end of the path and including a second setting means for engaging at least second selected ones of the drivers as they are carried toward the path, to urge the second selected drivers into the active position for moving the objects along the path; and a selection means for mounting the first and second control means to the support structure, and for selectively positioning either one of the first and second setting means in position to engage the drivers while the other of the control means remains free of the drivers.

14. The apparatus of claim 13 wherein:

the first control means further includes a first resetting means for engaging the drivers other than the first selected drivers as they are carried toward the path, to urge said other drive members into the bypass position; and wherein the second control means includes a second resetting means for engaging the drivers other than the second selected drivers as they are carried toward the path, to urge said other drivers into the bypass position.

15. The apparatus of claim 14 further including:

a governing means for moving the first and second cams relative to the support structure such that the first and second setting means, when engaging the respective first and second selected drivers, move at approximately the same speed as the endless conveyor means.

16. The apparatus of claim 14 wherein:

the first and second control means respectfully comprise first and second cams mounted rotatably to the support structure and having respective first and second pluralities of radially extended cam lobes, with said first and second setting and resetting means disposed at the radially outward ends of the first and second lobes, respectively.

17. The apparatus of claim 13 wherein:

the endless conveyor means comprises a pair of endless chains mounted to the support member in parallel and spaced apart relation to one another for movement in concert, with said drivers being mounted to both of the chains and disposed between the chains.

18. The apparatus of claim 17 wherein:

the support structure includes a guide means extended longitudinally along the path, for maintaining the selected drivers in the active position as they travel along the path.

19. The apparatus of claim 18 wherein:

the guide means comprise a pair of opposed and transversely spaced apart flange, and wherein each of the drivers includes a pair of extensions protruding transversely in opposite directions from the driver, and wherein the extensions when captured above the flanges maintain their associated drivers in the bypass position, and when captured below the flanges maintain their respective drivers in the active position.

20. The apparatus of claim 19 wherein:

the guide means further includes means for substantially confining the chains against transverse movement.

21. An apparatus for conveying objects in a series along a selected path and with controlled a spacing between successive objects in the series, including:

a stationary support structure having a support surface for supporting objects by gravity for movement along a selected path;

an endless conveyor means mounted on the support structure such that a portion of the length of the conveyor means runs along and adjacent the selected path;

a moving means for moving the endless conveyor relative to the support structure;

a plurality of drivers mounted to the endless conveyor means and spaced apart from one another along the length of the conveyor means, each of the drivers being mounted to reciprocate between an active position for engaging one of the objects to move the object along the selected path with said conveyor means, and a bypass position wherein the driver does not engage the object;

a first driver control means mounted movably to the support structure near one end of said path and including a first setting means for engaging first selected ones of the drivers as they are carried toward the path, to urge the first selected drivers into the active position for moving the object along the path, said first control means further including a first resetting means for engaging the drivers other than the first selected drivers as they are carried toward the path, to urge said other drivers into the bypass position; and a governing means for moving the control means relative to the support structure such that the setting means and the resetting means, when engaging the drive members, are moving at approximately the same speed as the endless conveyor means.

22. The apparatus of claim 21 wherein:

said governing means comprises a linkage driveably engaging the control means and the endless conveyor means.

23. The apparatus of claim 21 wherein:

the first control means comprises a first cam mounted rotatably to the support structure and having a plurality of radially extended lobes, with said setting and resetting means comprise respective setting and resetting surfaces disposed at the radially outward ends of the lobes.

24. The apparatus of claim 23 wherein:
the lobes are arranged in a repeating pattern to provide N resetting surfaces between each adjacent pair of setting surfaces, wherein N is an integer.

25. The apparatus of claim 21 wherein:
said endless conveyor means includes a pair of endless chains mounted to the support member in parallel and spaced apart relation to one another, and wherein the drivers are mounted to both of the chains and disposed between them.

26. The apparatus of claim 25 wherein:
the support structure includes a means extended longitudinally along the path for substantially confining the chains against transverse movement.

27. The apparatus of claim 26 wherein:
the support structure further includes a means along the path for maintaining each of the drivers in either of the active position and the bypass position as it travels along the path.

28. The apparatus of claim 21 further including:
a second driver control means mounted movably to the support member near said one end of the path and including a second setting means for engaging second selected ones of the drivers as the drivers are carried toward the path, to urge the second selected drivers into the active position for moving the objects along the path, said second control means further including a resetting means for engaging the drivers other than the second selected drivers as they are carried toward the path, to urge such other drivers into the bypass position.

29. The apparatus of claim 28 further including:
a third driver control means mounted movably to the support member near said one end of the path and including a third setting means for engaging third selected ones of the drivers as the drivers are carried toward the path, to urge the third selected drivers into the active position for moving the objects along the path, said third driver control means further including a resetting means for engaging the drivers other than the third selected drivers as they are carried toward the path, to urge such other drivers into the bypass position.

30. An apparatus for conveying objects in a series along a selected path, including:
a stationary support structure having a support surface for supporting objects by gravity for movement along a selected path;
a pair of endless chains mounted to the support structure in parallel and spaced apart relation to one another such that parallel portions of the lengths of the chains run along and adjacent the selected path;
a moving means operably coupled to the chains and to the support structure for moving the chains in concert with respect to the support structure;
a plurality of drivers spaced apart from one another along the chains, each driver mounted to the chains and substantially centrally disposed between the chains whereby each driver is carried by the chains along the path, for engaging an object and moving the object along the path;
each of the drivers being mounted to reciprocate relative to the endless chains between an active position for engaging one of the objects to move the object along the selected path with the chains, and a bypass position wherein the driver does not engage the object;
a driver control means mounted movably to the support structure near one end of the path and including a setting means for engaging at least selected ones of the drivers as they are carried toward the path by the chains, to urge the selected drivers into the active position for moving the objects along the path; and
a governing means for moving the control means relative to the support structure such that the setting means, when engaging the selected drivers is moving at approximately the same speed as the endless chains.

31. The apparatus of claim 30 wherein:
the support structure includes a confining means extended longitudinally along the path for substantially confining the chains against transverse movement.

32. The apparatus of claim 31 wherein:
the confining means comprises a pair of opposed elongate channels, each channel containing one of the chains and being slightly larger in transverse profile than its associated chain.

33. The apparatus of claim 32 wherein:
said support structure further includes a guide means for maintaining the drivers in either one of the active and bypass positions as the drivers travel along the path.

34. The apparatus of claim 33 wherein:
the guide means includes a pair of flanges parallel to the channels and extended transversely inward toward the drivers, and wherein each of the drivers includes a pair of opposed transverse extensions, each pair of extensions maintaining the associated driver in the active position when captured below the flanges and maintaining the associated driver in the bypass position when above the flanges.

35. An apparatus for conveying objects in a series along a selected path, including:
a stationary support structure having a support surface for supporting objects by gravity for movement along a selected path;
an endless conveyor means mounted on the support structure such that a portion of the length of the endless conveyor means runs along and adjacent the selected path;
a moving means operably coupled to the endless conveyor means and to the support structure for moving the endless conveyor means relative to the support structure;
a plurality of drivers spaced apart from one another along the length of the conveyor means, each driver mounted to the endless conveyor means whereby each driver is carried by the endless conveyor means along the path for engaging an object and moving the object along the path;
wherein each of the drivers is mounted to reciprocate relative to the endless conveyor means between an active position for engaging one of the objects to move the object along the selected path with the endless conveyor means, and a bypass position wherein the driver does not engage the object;
a driver control means mounted movably to the support structure near an upstream end of said path and including a setting means for engaging at least selected ones of the drivers as they are carried toward the path by the endless conveyor means, to urge the selected drivers into the active position for moving the objects along the path; and a governing means for moving the control means relative to the support structure such that the setting means, when engaging the selected drivers is moving at approximately the same speed as the endless conveyor means.

36. The apparatus of claim 35 wherein:
said endless conveyor means includes a pair of endless chains mounted to the support member in parallel and spaced apart relation to one another, and wherein the drivers are mounted to both of the chains and substantially centrally disposed between the chains.

* * * * *

UNITED STATES PATENT AND TRADEMARK OFFICE
CERTIFICATE OF CORRECTION

PATENT NO. : 5,125,501

DATED : June 30, 1992

INVENTOR(S) : Harold D. Dojan

It is certified that error appears in the above-identified patent and that said Letters Patent is hereby corrected as shown below:

Column 11, Claim 13, Line 16, "identical" should be -- selected --.

Column 12, Claim 19, Line 3, "flange" should be -- flanges --.

Column 12, Claim 21, Line 2, "controlled a spacing" should be -- a controlled spacing --.

Column 14, Claim 30, Line 12, after "means" delete the comma (,).

Column 14, Claim 35, Line 6, "on" should be -- to --.

Column 15, Claim 35, Line 5, after "means" delete the comma (,).

Signed and Sealed this

Seventeenth Day of August, 1993

Attest:

BRUCE LEHMAN

*Attesting Officer*

*Commissioner of Patents and Trademarks*